United States Patent
Badino et al.

(10) Patent No.: US 10,830,298 B2
(45) Date of Patent: Nov. 10, 2020

(54) BRAKE DISC FOR MOTOR-VEHICLE DISC BRAKES

(71) Applicant: FCA Italy S.p.A., Turin (IT)

(72) Inventors: Renato Badino, Turin (IT); Stefano Luca, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/927,651

(22) Filed: Mar. 21, 2018

(65) Prior Publication Data
US 2018/0283481 A1 Oct. 4, 2018

(30) Foreign Application Priority Data
Mar. 28, 2017 (EP) .................................... 17163195

(51) Int. Cl.
| | |
|---|---|
| *F16D 65/12* | (2006.01) |
| *F16D 65/00* | (2006.01) |
| *F16D 65/02* | (2006.01) |
| *F16D 69/00* | (2006.01) |

(52) U.S. Cl.
CPC .... *F16D 65/127* (2013.01); *F16D 2065/1328* (2013.01); *F16D 2065/1332* (2013.01); *F16D 2069/004* (2013.01); *F16D 2250/0076* (2013.01)

(58) Field of Classification Search
CPC ........... F16D 65/127; F16D 2065/1328; F16D 2065/1332; F16D 2069/004; F16D 2250/0076
See application file for complete search history.

(56) References Cited

U.S. PATENT DOCUMENTS

| | | | | |
|---|---|---|---|---|
| 4,286,694 | A | * | 9/1981 | Wiseman, Jr. .......... F16D 55/40 188/218 XL |
| 5,662,192 | A | * | 9/1997 | Kingston .............. F16D 65/127 188/1.11 W |
| 5,735,366 | A | * | 4/1998 | Suga ................... F16D 65/0006 188/218 XL |
| 6,186,293 | B1 | | 2/2001 | Beer et al. |

(Continued)

FOREIGN PATENT DOCUMENTS

| | | |
|---|---|---|
| AU | 464416 B2 | 8/1975 |
| JP | 201092933 A * | 4/2010 |

OTHER PUBLICATIONS

European Search Report for EP Application No. 17163195.5 dated Sep. 18, 2017, 3 pages.

*Primary Examiner* — Melody M Burch
(74) *Attorney, Agent, or Firm* — RMCK Law Group, PLC

(57) ABSTRACT

A brake disc for motor-vehicle disc brakes, includes a body with a hub and two opposite annular planar faces, wherein at least one of these faces is formed with one or more lines defining a surface irregularity, in the form of grooves or ribs, which extend between a radially inner edge and a radially outer edge of the respective face, so as to substantially cover the entire radial extension of the face. A height of the surface irregularity along said lines is less than 0.30 mm, so that during use, the lines defining the surface irregularity disappear, due to wear of the respective face, after an initial fraction of the life of the brake disc. During this initial stage, the lines defining the surface irregularity reduce the time necessary to obtain a bedding of the disc brake with respect to a case of a brake disc devoid of the lines.

6 Claims, 3 Drawing Sheets

(56) References Cited

U.S. PATENT DOCUMENTS

Figure 1:
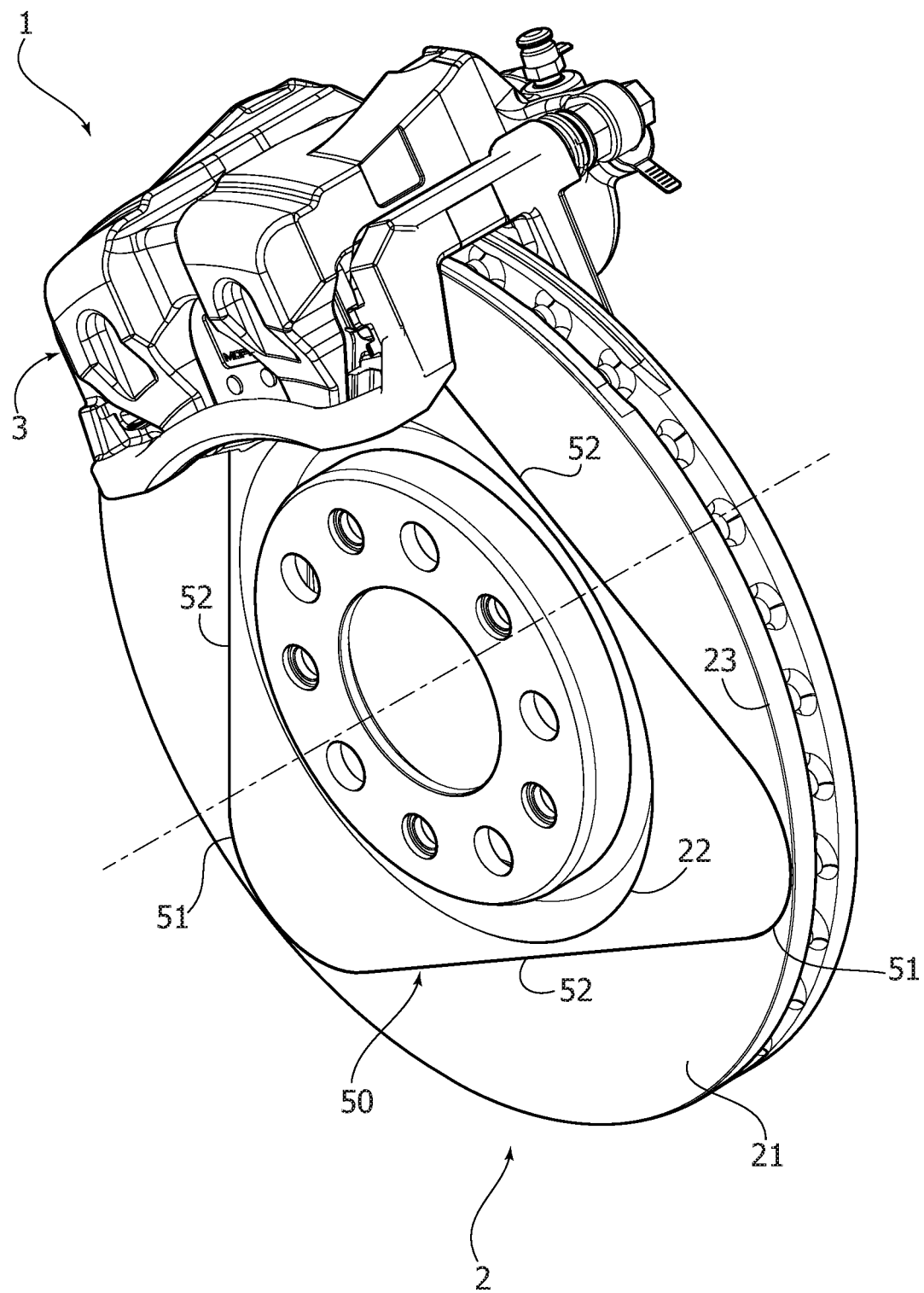

| | | | |
|---|---|---|---|
| 6,279,698 B1 * | 8/2001 | Oberti | F16D 65/127 188/1.11 W |
| 6,415,894 B2 * | 7/2002 | Giorgetti | F16D 63/004 188/18 R |
| 2002/0025090 A1 * | 2/2002 | Sakatani | F16C 17/026 384/107 |
| 2014/0165350 A1 | 6/2014 | O'Neil | |

* cited by examiner

BRAKE DISC FOR MOTOR-VEHICLE DISC BRAKES

CROSS REFERENCE TO RELATED APPLICATIONS

This application claims priority to European Patent Application No. 17163195.5 filed on Mar. 28, 2017, the entire disclosure of which is incorporated herein by reference.

FIELD OF THE INVENTION

The present invention relates to brake discs for motor-vehicle disc brakes, of the type comprising a body with a hub and two opposite annular planar faces, wherein at least one of these faces is formed with one or more lines defining a surface irregularity, which lines extend between a radially inner edge and a radially outer edge of the respective face, so as to substantially cover the entire radial extension of said face.

PRIOR ART

A brake disc of the type indicated above is described for example in U.S. Pat. No. 6,186,293 B1. In brake discs of this type, the aforesaid lines defining a surface irregularity are grooves formed on one or both the main faces of the brake disc.

According to this prior art, the aforesaid grooves fulfil the object of improving the cooling of the brake disc thanks to the increase in the cooling surface and the obtainment of turbulence in the flow of cooling air. In these known solutions, the grooves formed on the faces of the brake disc also fulfil the object of improving the brake response when the brake disc is wet, since the water that is deposited on the disc can be drained through the grooves. Another advantage of the brake discs of this type is that they also provide a visual indication of the wear of the disc. Indeed, when the brake disc has been worn out by an entity corresponding to the depth of the grooves, the grooves disappear, which enables an immediate visual check of the need to replace the brake disc.

As is clearly evident from the above, in all the known solutions mentioned above, the grooves formed in the faces of the brake disc are sized in order to fulfill their function throughout the entire operating life of the brake disc.

It should be added that a general problem of motor-vehicle disc brakes lies in the fact that, after their installation, they are not able to operate in an optimal way until the so-called "bedding" has been carried out of the disc brake pads. This bedding stage is required to obtain a perfect cooperation between the brake disc and the brake pads.

Naturally, it is desirable that the duration of the bedding stage is as short as possible, so as to rapidly enable the brake to operate in an optimal way.

OBJECT OF THE INVENTION

The main object of the present invention is that of producing a brake disc for motor-vehicle disc brakes which provides a dramatic reduction of the duration of the bedding stage of the brake after installation of the disc.

A further object of the invention is to achieve the above aim with a brake disc that can be manufactured with relatively simple and rapid operations, and with a relatively low cost.

A further object of the invention is to provide a brake disc that, in the stage after bedding, is able to operate correctly for an extended period of operation, such as a conventional brake disc.

SUMMARY OF THE INVENTION

In view of achieving the aforesaid objects, the invention relates to a brake disc for disc brakes of motor-vehicles having the characteristics indicated at the beginning of the present description and further characterized in that the height of the surface irregularity along said lines defining a surface irregularity is less than 0.30 mm, in such a way that during use, after the installation of said brake disc, the aforesaid lines defining a surface irregularity reduce the time required to obtain a bedding of the disc brake with respect to the case of a brake disc devoid of said lines, but at the same time said lines disappear, due to wear of said face, once bedding is completed, after an initial fraction of the life of the brake disc.

In a first embodiment, said one or more lines defining a surface irregularity are constituted by one or more grooves formed in said main face and defining sharp edges on said main face.

In a second embodiment, said one or more lines defining a surface irregularity are constituted by one or more ribs or ridges formed in said main face and defining sharp edges at the top of said ribs.

Studies and experiments conducted by the Applicant have shown that the forming of grooves or ribs having a depth/height less than 0.30 mm promotes the initial bedding stage of the brake. It is believed that this is due to the fact that the lines defining a surface irregularity define sharp edges that have a greater friction upon the brake pad surface, against which they slide during braking. The tests conducted by the Applicant have shown that, thanks to this effect, the time required to complete the initial bedding stage can be halved with respect to the case of an identical brake in which the brake disc has completely smooth faces, devoid of the aforesaid lines defining a surface irregularity.

Still in the case of the preferred embodiment, said grooves or said ribs have a height of less than 0.20 mm, and preferably between 0.02 mm and 0.15 mm. The width of said grooves or ribs, in a preferred example, is substantially equal to the height.

Still in the case of said preferred embodiment, the aforesaid grooves and ribs are obtained by an operation of laser marking.

The design formed by said lines defining a surface irregularity can be of any type. In one embodiment, each main face of the brake disc has a single line defining a surface irregularity in the form of a groove or rib, defining a triangular design with rounded vertices. The vertices of the triangle are adjacent to the radially outer edge of the respective face of the disc, and the three sides of the triangle are substantially tangent to the radially inner edge of the respective main face.

DESCRIPTION OF AN EMBODIMENT

Figure 2:
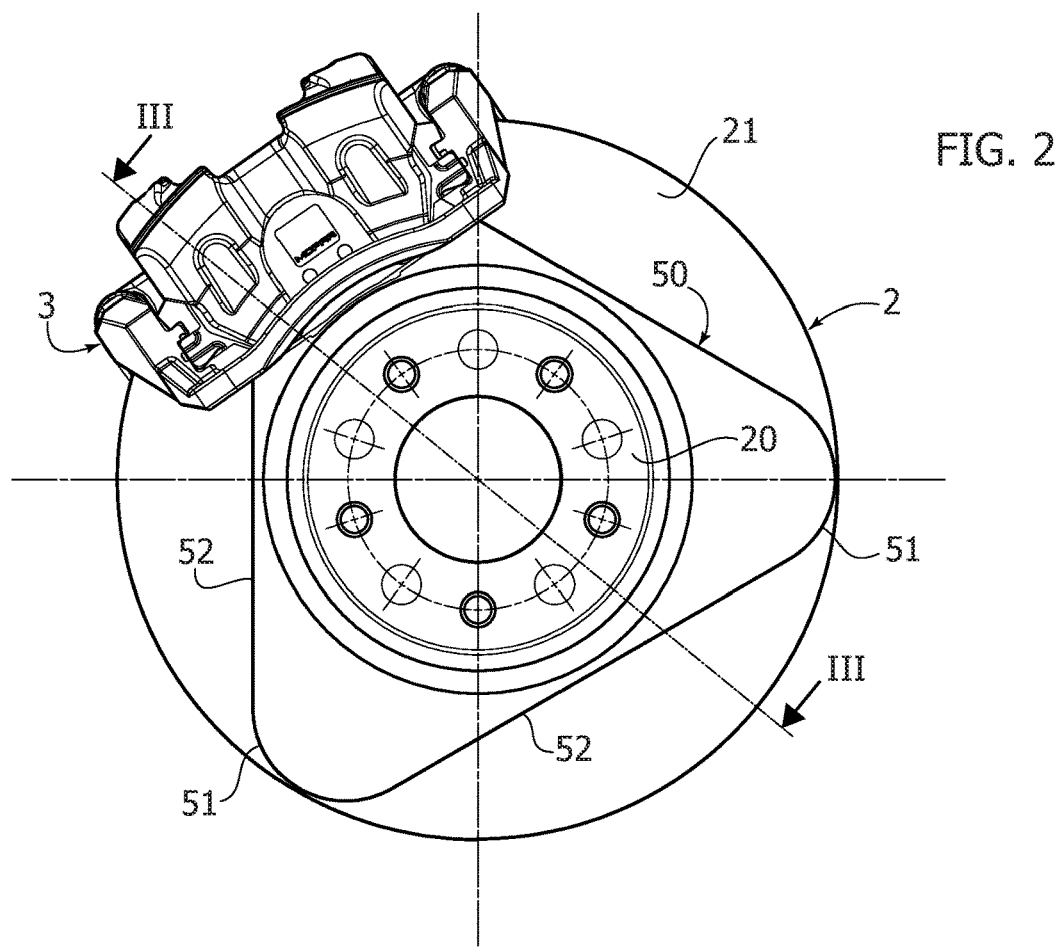
Figure 3:
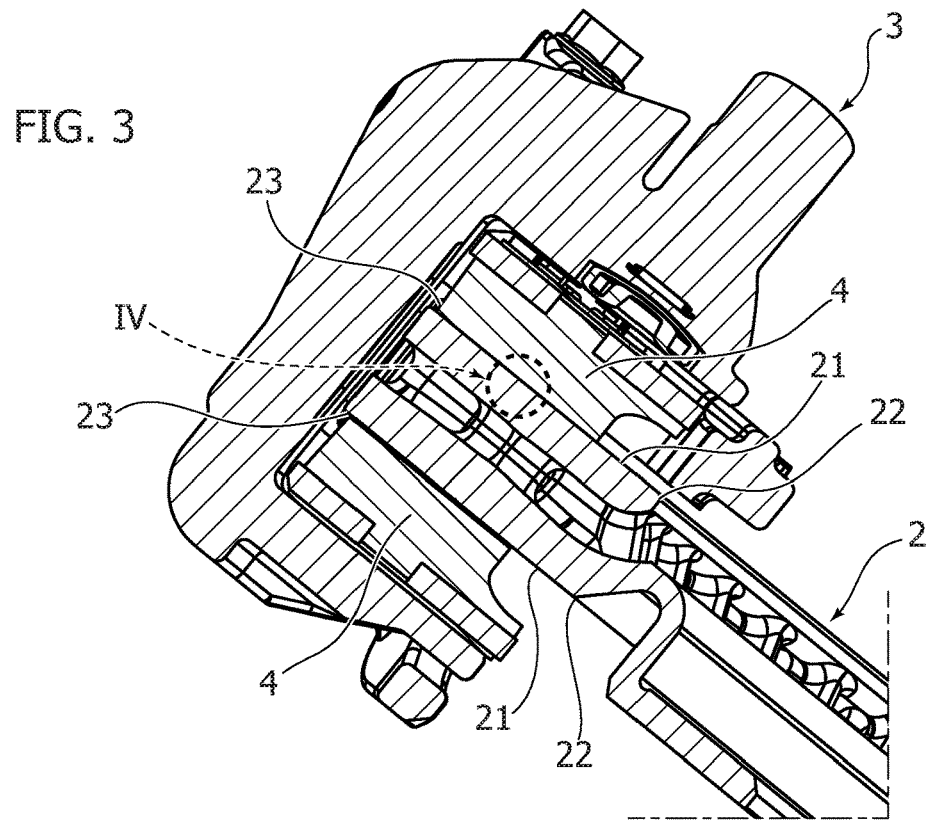
Figure 4:
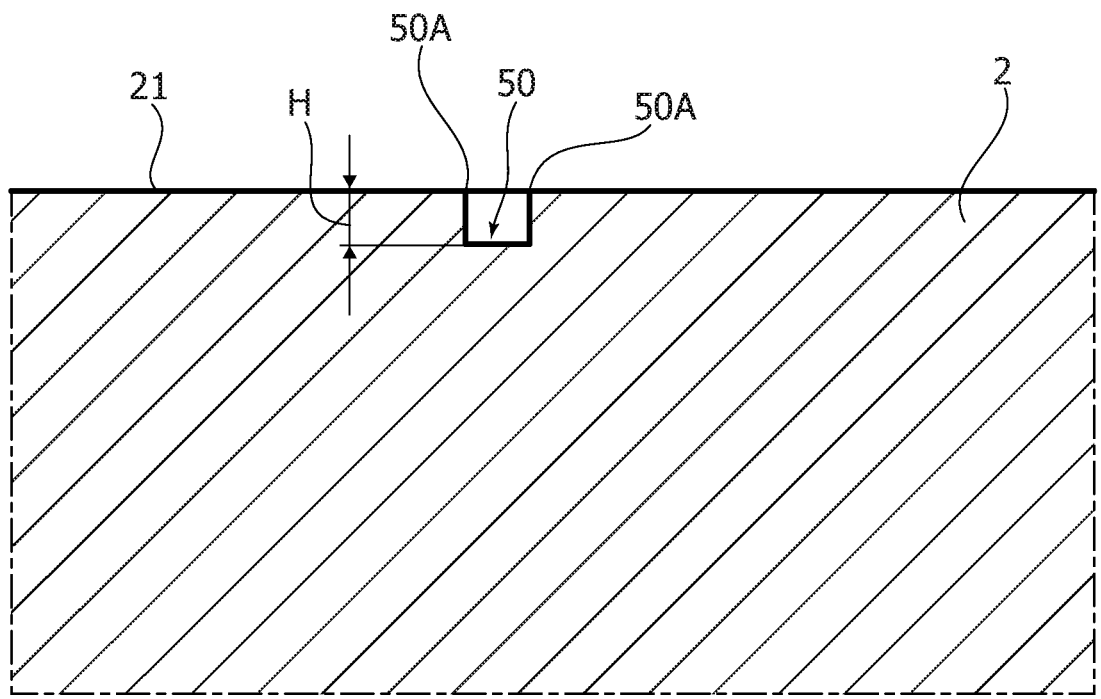
Figure 5:
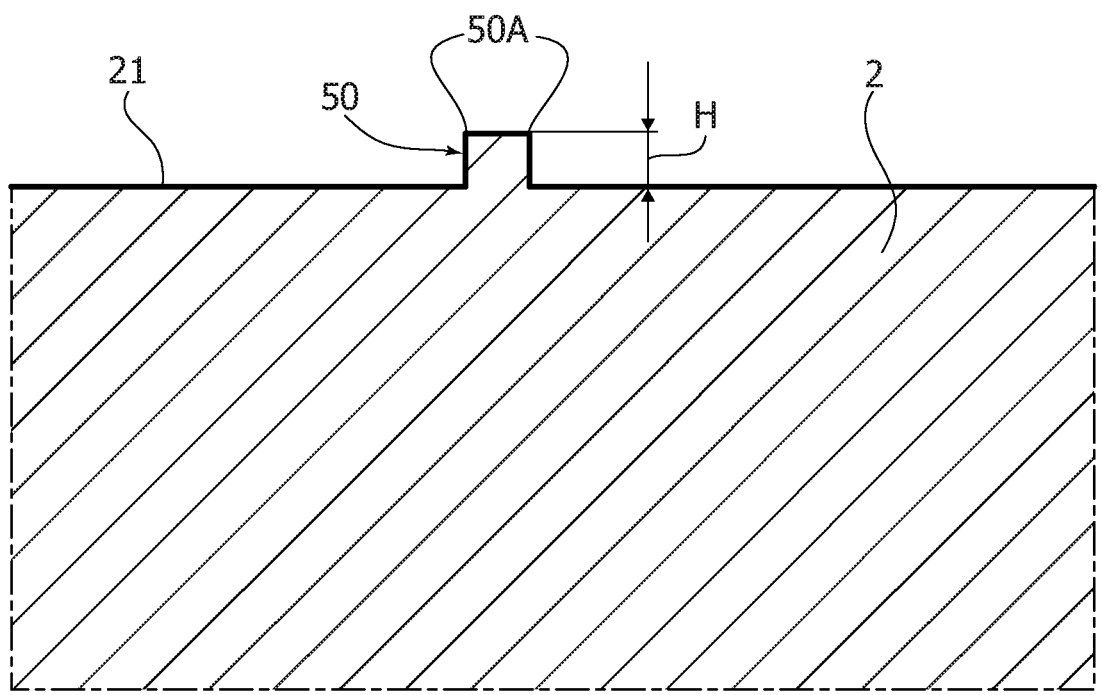

Further characteristics and advantages of the invention will become apparent from the description that follows with reference to the attached drawings, provided purely by way of non-limiting example, wherein:

FIG. 1 is a perspective view of a disc brake assembly including a brake disc according to the invention and a brake caliper associated therewith, FIG. 2 is a front view of the disc brake assembly of FIG. 1, FIG. 3 is a detail on an enlarged scale of a view in cross-section according to the line III-III of FIG. 2, FIG. 4 is a cross-sectional view on a magnified scale of a detail indicated by the arrow IV of FIG. 3, and FIG. 5 illustrates a variant of FIG. 4.

With reference to FIG. 1, the number 1 indicates—in its entirety—a disc brake assembly, including a brake disc 2 and a brake caliper 3 of any known type, provided with brake pads 4 (see FIG. 3) that can be pressed by a respective actuator (not illustrated) against the two opposite faces of the brake disc 2 to slow the rotation during braking of the motor-vehicle on which the brake disc assembly is mounted.

Still with reference to FIG. 1, the brake disc 2 has a body with a hub 20 and two annular and opposite planar faces 21, which cooperate with the brake pads 4 for the braking action.

According to the invention, at least one of the faces 21 (both faces in the illustrated case) is formed with a line defining a surface irregularity 50, which is formed by a groove (FIG. 4) in a first embodiment and a rib (FIG. 5) in a second embodiment.

As shown in FIGS. 1 and 2, in the case of the illustrated example, the line 50 defines a triangular design having rounded vertices 51 tangent to the radially outer edge 23 of the face 21 and sides 52 tangent to the radially inner edge 22, adjacent to the hub 20, of each face 21. FIGS. 1 and 2 show only one and the same face of the disc, but it is understood that the hidden face of the disc is configured in an identical manner. The invention, however, also applies to the case where the two faces of the disc present different designs or to the case where only one of the two faces is shaped according to the disclosure of the present invention.

Naturally, the line 50, or lines 50, can be of any configuration. For example, it is possible to provide more lines 50 separated from each other, instead of a single line as in the case of the illustrated example. In any case, the lines defining a surface irregularity 50 extend so as to cover the entire radial dimension of the respective face of the disc, between the radially inner edge 22 and the radially outer edge 23.

According to an important characteristic of the invention, the height of the surface irregularity along each line 50, or rather the depth H in the case of the groove 50 (FIG. 4) or the height H of the rib 50 (FIG. 5) is less than 0.30 mm and is preferably less than 0.20 mm.

As already indicated above, in a specific case, the height H was chosen between 0.02 mm and 0.15 mm.

The tests conducted by the Applicant have shown that a dimension of the type indicated above is critical in order to obtain two results.

Firstly, the duration of the initial bedding stage of the brake, after the installation of the disc 2, is drastically reduced (substantially halved) with respect to that which occurs with an identical brake having a brake disc with smooth faces. It is believed that this effect is due to the action of the sharp edges 50A defined by the grooves 50, or by the ribs 50, against the surface of the brake pads that come into contact with them during braking.

Secondly, the aforesaid dimension of the height H is such that the aforesaid lines defining a surface irregularity disappear, due to wear of the respective faces of the brake disc 2, after bedding is completed, after an initial fraction of the life of the brake disc, which is slightly greater than the duration of the bedding stage.

With reference again to FIGS. 4 and 5, the lines defining a surface irregularity 50 are defined, both in the case of grooves 50, and in the case of ribs 50, so as to form sharp edges 50A. In the case of grooves (FIG. 4), the sharp edges 50A are the edges that appear on the face 21 of the brake disc 2, while in the case of ribs 50 (see FIG. 5), the sharp edges 50A are formed at the top of the ribs. In either case, the surface irregularities 50 considerably increase the action against the surface of the brake pads, with the advantage of drastically reducing the duration of the initial bedding stage. At the same time, as already indicated, the aforesaid lines defining a surface irregularity disappear once the bedding stage is completed due to wear of the disc, so that for the major portion of the life of the brake, the brake disc works with its main faces smooth. This aspect constitutes an important difference compared to known solutions in which grooves are provided on the main faces of the brake disc, which persist for the entire operative life of the disc.

Naturally, without prejudice to the principle of the invention, the details of construction and the embodiments may vary widely with respect to those described and illustrated purely by way of example, without departing from the scope of the present invention.

What is claimed is:

1. A brake disc for motor-vehicle disc brakes including a caliper provided with friction pads, the brake disc comprising:
    a body with a hub and two annular planar faces, wherein at least one of these faces is formed with one or more lines defining a surface irregularity, which lines extend between a radially inner edge and a radially outer edge of the at least one face, so as to substantially cover an entire radial extension of said at least one face,
    wherein said one or more lines defining the surface irregularity are constituted by one or more grooves formed in the at least one face and define outboard sharp edges on said at least one face to increase friction against a mating friction pad of the friction pads, and wherein a height range of the surface irregularity along said one or more lines defining the surface irregularity is 0.02 mm to 0.15 mm, so that during use, after installation of the brake disc, said one or more lines defining the surface irregularity reduce a time necessary to obtain a bedding of the disc brake with respect to a case of a brake disc devoid of said one or more lines, while said one or more lines disappear, due to initial wear of the at least one face, once the bedding is completed, after an initial fraction of a life of the brake disc such that for a remaining portion of the life of the brake disc the at least one face is devoid of said one or more lines defining the surface irregularity and smooth, and
    wherein a width of said one or more lines defining the surface irregularity is substantially equal to a height of the height range.

2. A brake disc for motor-vehicle disc brakes including a caliper provided with friction pads, the brake disc comprising:
    a body with a hub and two annular planar faces, wherein at least one of these faces is formed with one or more lines defining a surface irregularity, which lines extend between a radially inner edge and a radially outer edge of the at least one face, so as to substantially cover an entire radial extension of said at least one face,
    wherein said one or more lines defining the surface irregularity are constituted by one or more ribs formed on the at least one face and defining sharp outboard edges at a top of said one or more ribs to increase friction against a mating friction pad of the friction pads, and wherein a height range of the surface irregularity along said one or more lines defining the surface irregularity is 0.02 mm to 0.15 mm, so that during use, after installation of the brake disc, said one or more lines defining the surface irregularity reduce a time necessary to obtain a bedding of the disc brake with respect to a case of a brake disc devoid of said one or more lines, while said one or more lines disappear, due to initial wear of the at least one face, once the bedding is completed, after an initial fraction of a life of the brake disc such that for a remaining portion of the life of the brake disc the at least one face is devoid of said one or more lines defining the surface irregularity and smooth, and wherein a width of said one or more lines defining the surface irregularity is substantially equal to a height of the height range.

3. The brake disc according to claim 1, wherein the one or more lines comprises a single line defining the surface irregularity on each of said faces of the brake disc, each line defining a triangular design with rounded vertices which are adjacent to the radially outer edge of the respective face and three sides substantially tangent to the radially inner edge of the respective face.

4. The brake disc according to claim 1, wherein said one or more grooves are formed by laser cutting.

5. The brake disc according to claim 2, wherein said ribs are formed by laser welding with weld material.

6. A method for controlling operation of a brake disc for motor vehicle disc brakes including a caliper provided with friction pads, the disc brake having a body with a hub and two annular plantar faces, the method including:

forming on at least one of these two faces, one or more lines defining a surface irregularity, which lines extend between a radially inner edge and a radially outer edge of said at least one face, in such a way as to substantially cover an entire radial extension of the at least one face, the forming of the one or more lines defining the surface irregularity includes forming the one or more lines defining the surface irregularity:

to have a height range of the surface irregularity along said lines defining the surface irregularity be 0.02 mm to 0.15 mm, wherein a width of said one or more lines defining the surface irregularity is substantially equal to a height of the height range;

to define outboard sharp edges on said at least one face to increase friction against a mating friction pad of the friction pads;

to, during use of the disc brake, after installation of the brake disc, disappear due to initial wear of the at least one face, once the bedding is completed, after an initial fraction of a life of the brake disc such that for a remaining portion of the life of the brake disc the at least one face is devoid of said one or more lines defining the surface irregularity and smooth; and during use of the disc brake, after installation of the brake disc, using said formed lines defining the surface irregularity to reduce a time necessary to obtain a bedding of the disc brake with respect to a case of a brake disc devoid of said lines.

\* \* \* \* \*